US009807576B2

(12) United States Patent
Smith et al.

(10) Patent No.: US 9,807,576 B2
(45) Date of Patent: *Oct. 31, 2017

(54) APPARATUS AND METHOD FOR AUTOMATIC REPEAT REQUEST WITH REDUCED RESOURCE ALLOCATION OVERHEAD IN A WIRELESS VOIP COMMUNICATION SYSTEM

(71) Applicant: Google Technology Holdings LLC, Mountain View, CA (US)

(72) Inventors: Jack A. Smith, Valley View, TX (US); Hao Bi, Lake Zurich, IL (US); Sean M. Mcbeath, Keller, TX (US); James M. O'connor, Dallas, TX (US); Danny Pinckley, Arlington, TX (US); John D. Reed, Arlington, TX (US)

(73) Assignee: Google Technology Holdings LLC, Mountain View, CA (US)

(\*) Notice: Subject to any disclaimer, the term of this patent is extended or adjusted under 35 U.S.C. 154(b) by 86 days.

This patent is subject to a terminal disclaimer.

(21) Appl. No.: 14/717,389

(22) Filed: May 20, 2015

(65) Prior Publication Data

US 2015/0256983 A1 Sep. 10, 2015

Related U.S. Application Data

(63) Continuation of application No. 11/464,179, filed on Aug. 11, 2006, now Pat. No. 9,065,651.

(51) Int. Cl.
*H04W 4/00* (2009.01)
*H04W 4/08* (2009.01)
(Continued)

(52) U.S. Cl.
CPC ............ *H04W 4/08* (2013.01); *H04L 1/1621* (2013.01); *H04L 1/18* (2013.01); *H04L 1/1812* (2013.01);
(Continued)

(58) Field of Classification Search
CPC . H04W 72/005; H04W 4/08; H04W 72/0406; H04W 28/04; H04W 72/04;
(Continued)

(56) References Cited

U.S. PATENT DOCUMENTS 5,946,306 A * 8/1999 Talarmo .............. H04W 72/042
370/337
6,327,254 B1 * 12/2001 Chuah ................. H04L 12/2602
370/322
(Continued)

FOREIGN PATENT DOCUMENTS

EP 0589280 A2 3/1994
EP 0703685 A2 3/1996
(Continued)

OTHER PUBLICATIONS

"Joint Proposal for 3GPP2 Physical Layer for FDD Spectra,", China Unicorn et al., 3GPP2, C30-2000731-040R4 (Jul. 31, 2006).
(Continued)

*Primary Examiner* — Abdelnabi O Musa
(74) *Attorney, Agent, or Firm* — Lerner, David, Littenberg, Krumholz & Mentlik, LLP

(57) ABSTRACT

A base station (103) assigns a set of mobile stations (101) to a group wherein the group will share a set of radio resources (770). A shared control channel information element (501) is sent to the group of mobile stations (101) and provides a bitmap having fields for group ordering (511), resource allocations (530), continuation resources (540) for HARQ, and an ordering pattern (513). If a mobile station requires retransmission it will access the resources indicated by the continuation resources field (54) in order to receive data. The HARQ blocks may be assigned to a mobile station based upon an index (601) which may correspond to the mobile station vocoder rate. Further, HARQ subgroups may be defined to associate subgroups of mobile stations with
(Continued)

specific HARQ transmission opportunities on the superframe and allocated by a rotating bitmap.

15 Claims, 14 Drawing Sheets

(51) Int. Cl.
*H04L 1/18* (2006.01)
*H04W 72/00* (2009.01)
*H04L 1/16* (2006.01)
*H04W 28/04* (2009.01)
*H04W 72/04* (2009.01)

(52) U.S. Cl.
CPC ......... *H04L 1/1887* (2013.01); *H04W 72/005* (2013.01); *H04W 72/0406* (2013.01); *H04W 28/04* (2013.01); *H04W 72/04* (2013.01)

(58) Field of Classification Search
CPC ....... H04L 1/1621; H04L 1/18; H04L 1/1882; H04L 1/1887
See application file for complete search history.

(56) References Cited

U.S. PATENT DOCUMENTS

| | | | |
|---|---|---|---|
| 6,839,356 B2 | 1/2005 | Barany et al. | |
| 7,343,170 B1 | 3/2008 | Feeney et al. | |
| 7,436,763 B1 | 10/2008 | Phelps et al. | |
| 7,751,363 B1 | 7/2010 | Etemad et al. | |
| 2002/0159410 A1 | 10/2002 | Odenwalder et al. | |
| 2004/0057402 A1 | 3/2004 | Ramos et al. | |
| 2004/0087320 A1 | 5/2004 | Kim et al. | |
| 2004/0093548 A1 | 5/2004 | Heo et al. | |
| 2004/0160936 A1 | 8/2004 | Liu et al. | |
| 2005/0157678 A1 | 7/2005 | Mantha et al. | |
| 2005/0201325 A1 | 9/2005 | Kang et al. | |
| 2005/0216938 A1 | 9/2005 | Brady et al. | |
| 2006/0195767 A1* | 8/2006 | Ihm | H04L 1/0656 714/776 |
| 2006/0212333 A1 | 9/2006 | Jackson | |
| 2008/0187136 A1 | 8/2008 | Zhang et al. | |
| 2009/0022098 A1* | 1/2009 | Novak | H04L 1/14 370/329 |

FOREIGN PATENT DOCUMENTS

| | | |
|---|---|---|
| EP | 0917316 A2 | 5/1999 |
| EP | 1542487 A1 | 6/2005 |
| GB | 2328845 A | 3/1999 |
| WO | 2007044173 A2 | 4/2007 |

OTHER PUBLICATIONS

International Search Report and Written Opinion for Application No. PCT/US2007/075347 dated Jan. 9, 2008.
"Universal Mobile Telecommunications System (UMTS); FDD enhanced uplink; Overall description; Stage 2 (3GPP TS25.309 version 6.4.0 Release 6); ETSI TS125 309", ETSI Standards, European Telecommunications Standards Institute, Sophia-Antipo, FR, vol. 3-R2, No. V640, Sep. 2005 (Sep. 2005), XP014031929.
International Preliminary Report on Patentability for Application No. PCT/US2007/075347 dated Feb. 17, 2009.
Patent Cooperation Treaty, "PCT Search Report and Written Opinion of the International Searching Authority" for International Application No. PCT/US2007/073482 dated Apr. 10, 2008, 16 pages.

* cited by examiner

| INDEX | NUMBER OF BLOCKS FOR FIRST HARQ TRANSMISSION OPPORTUNITY | NUMBER OF BLOCKS FOR SECOND HARQ TRANSMISSION OPPORTUNITY | NUMBER OF BLOCKS FOR THIRD HARQ TRANSMISSION OPPORTUNITY | NUMBER OF BLOCKS FOR FOURTH HARQ TRANSMISSION OPPORTUNITY |
|---|---|---|---|---|
| '00' | 1 | 1 | 1 | 1 |
| '01' | 2 | 1 | 1 | 1 |
| '10' | 2 | 2 | 1 | 1 |
| '11' | 4 | 2 | 1 | 1 |

*FIG. 6*

APPARATUS AND METHOD FOR AUTOMATIC REPEAT REQUEST WITH REDUCED RESOURCE ALLOCATION OVERHEAD IN A WIRELESS VOIP COMMUNICATION SYSTEM

CROSS-REFERENCE TO RELATED APPLICATIONS

The present application is a continuation of U.S. patent application Ser. No. 11/464,179, filed Aug. 11, 2006, which is related to: U.S. patent application Ser. No. 11/460,908 (Filing Date Jul. 28, 2006) "APPARATUS AND METHOD FOR HANDLING CONTROL CHANNEL RECEPTION/DECODING FAILURE IN A WIRELESS VOIP COMMUNICATION SYSTEM," which is assigned to the same assignee as the present application, and which is hereby incorporated by reference herein.

FIELD OF THE DISCLOSURE

The present disclosure relates generally to Voice-over-Internet-Protocol (VoIP) wireless communication networks and more particularly to hybrid automatic repeat request (HARQ) and methods and apparatuses with reduced signaling overhead in VoIP HARQ wireless communications systems.

BACKGROUND

Wireless communications systems, for example packet based communications systems, may provide voice telephony using the Voice-over-Internet-Protocol (VoIP). Any historical demarcation between "data" and "voice" has become blurred in packet based communications systems such that the term "data" usually signifies payload information for any service, whether voice, or data such as may be provided by downloading from the Internet.

Differences remain however, in that voice will generally employ smaller packet sizes, for example due to delay sensitivity, than would traditional so-called data. For, example a non-voice data packet may be larger than a kilo-byte while a voice packet may be only approximately 15 to 50 bytes depending upon the vocoder rate employed.

Because of the smaller packet sizes utilized by voice sessions, a greatly increased number of voice users may be served thereby placing a burden on the control mechanisms and resources of the communications system.

However, RTP/UDP/IP (Real-Time Transport protocol/User Datagram Protocol/Internet protocol) overhead is added to each vocoder packet, in addition to Cyclic Redundancy Check (CRC) bits, etc. Systems that employ Hybrid Automatic Repeat Request are further burdened by such protocol overhead in addition to control requirements.

HARQ may make use of persistent channels for retransmissions, however such control resources require additional processing and transmission and therefore consumes even more resources which would have been available for voice traffic thus further burdening the network.

Thus, there is a need for providing mobile stations with resources for HARQ retransmissions without persistent assignments and without significantly increasing the overhead of the communication system.

BRIEF DESCRIPTION OF THE DRAWINGS

FIG. 6 illustrates a resource allocation table, where the resource allocation table indicates the number of blocks allocated for each HARQ transmission opportunity, in accordance with some embodiments.

DETAILED DESCRIPTION

Figure 1:
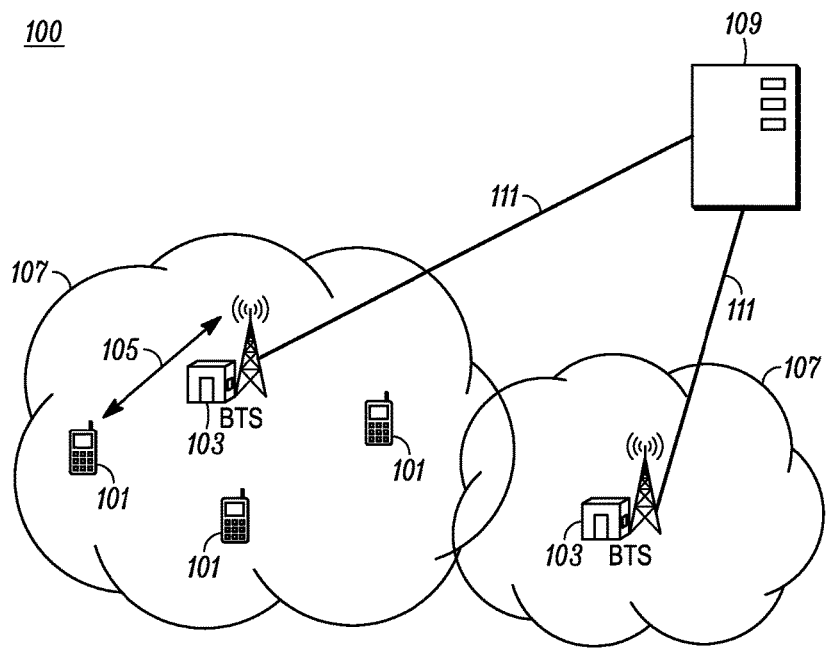
FIG. 1 is a block diagram of a wireless communication network.

Turning now to the drawings wherein like numerals represent like components, FIG. 1 illustrates a communications network 100, with various base stations 103, each base station 103 having a corresponding coverage area 107. In general, base station coverage areas may overlap and, in general, form an overall network coverage area. The base stations may be referred to by other names such as base transceiver station (BASE STATION), "Node B", and access node (AN), depending on the technology. A network coverage area may comprise a number of base station coverage areas 107, which may form a contiguous radio coverage area. However, it is not required to have contiguous radio coverage and therefore a network coverage area may alternatively be distributed.

Furthermore, each coverage area may have a number of mobile stations 101. A number of bases stations 103 will be connected to a base station controller 109 via backhaul connections 111. The base station controller 109 and base stations form a Radio Access Network (RAN). The overall network may comprise any number of base station controllers, each controlling a number of base stations. Note that the base station controller 109 may alternatively be implemented as a distributed function among the base stations 103. Regardless of specific implementations, the base station controller 109 comprises various modules for packetized communications such as a packet scheduler, packet segmentation and reassembly, etc., and modules for assigning appropriate radio resources to the various mobile stations 101.

The base stations 103 may communicate with the mobile stations 101 via any number of standard air interfaces and using any number of modulation and coding schemes. For example, Universal Mobile Telecommunications System (UMTS), Evolved UMTS (E-UMTS) Terrestrial Radio Access (E-UTRA) or CDMA2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface. Further the network may be an Evolved High Rate Packet Data (E-HRPD) network. Any appropriate radio interface may be employed by the various embodiments.

Figure 2:
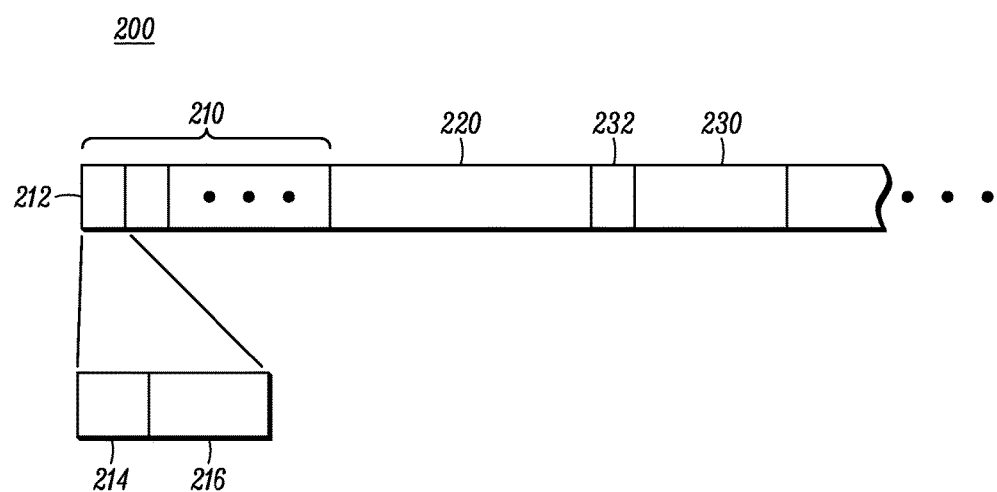
FIG. 2 is block diagram of a sequence of super frames each comprising a several frames.

FIG. 2 illustrates a sequence of super frames 200 useful for communicating in the wireless communication systems of the various embodiments. In FIG. 2, the super frame sequence generally comprises a number of super frames 210, 220, 230, etc., wherein each super frame comprises a number of frames. For example, super frame 210 comprises a frame 212 having a resource assignment control channel portion within a control channel portion 214 and a data channel portion 216.

Figure 3:
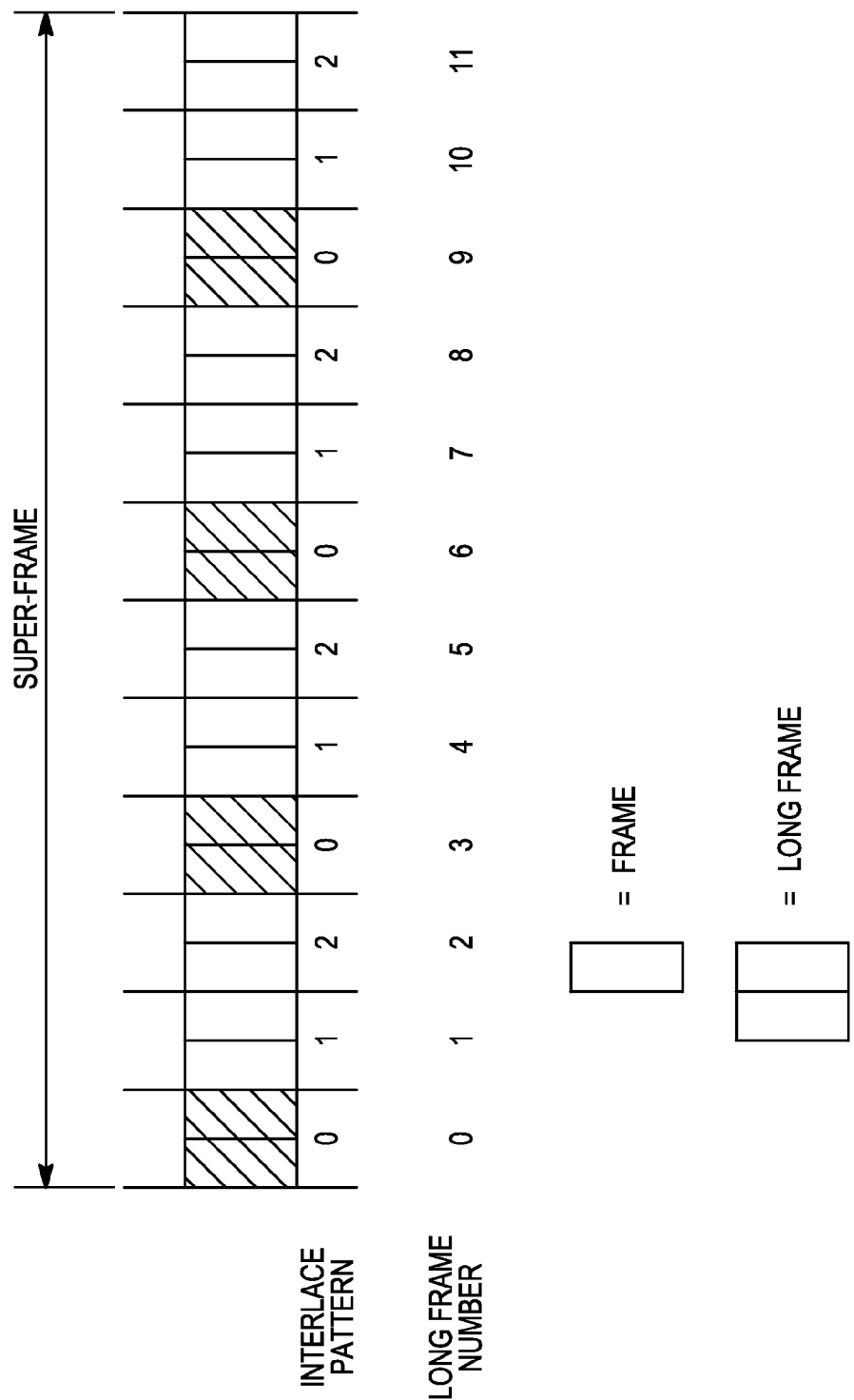
FIG. 3 is diagram showing a sequence of long frames each comprising one or more frames.

FIG. 3 illustrates a sequence of repeating long frames, wherein two frames are grouped to form a long frame. In some embodiments, a long frame is equivalent to a single frame. An interlace pattern is defined as a sequence of regularly distanced long frames. For systems employing synchronous hybrid automatic repeat request (HARQ) (S-HARQ), the initial and subsequent transmissions typically occur in the same interlace pattern. In this illustrative example, 12 long frames, denoted long frame 0 through 11, make up a super-frame.

For orthogonal frequency division multiple access (OFDMA) systems, the frequency domain is divided into subcarriers. For example, a 5 MHz OFDMA carrier, may be divided into 480 subcarriers, with a subcarrier spacing of 9.6 kHz. An OFDMA frame may be divided into multiple OFDM symbols. For example, a frame may occupy 0.91144 msec and contain 8 OFDM symbols, where each symbol occupies approximately 113.93 psec. The subcarriers are grouped to form block resource channels (BRCH) and distributed resource channels (DRCH). A BRCH is a group of contiguous subcarriers that may hop within a larger bandwidth, while a DRCH is a group of noncontiguous sub-carriers.

In the various embodiments, the base station controller 109, the base stations 103, or some other network infrastructure component groups mobile stations 101 into one or more groups for scheduling purposes. The mobile stations 101 may be grouped based on radio channel conditions associated with the mobile stations, for example, channel quality information reported by the mobile stations, Doppler reported by the mobile stations, distance from the serving cell, etc. Alternatively, or additionally, the mobile stations 101 may be grouped based on one or more mobile station operating characteristics other than participation in a common communication session. Exemplary mobile station operating characteristics include power headroom of the mobile stations, macro diversity considerations, mobile station capability, service of the mobile station, codec rate, etc. Further, mobile stations with an active VoIP session may be grouped together.

In another embodiment, the base station controller 109, the base stations 103, or some other network infrastructure component may assign multiple mobile stations to the same group position. For example, all mobile stations participating in the same group call may be assigned to the same group position. Similarly, all mobile stations registered for a particular broadcast/multicast session may be assigned to the same group position. In this way, the base station indicates the presence or absence of a group call or a broadcast/multicast session to several mobile stations using a single bit in the shared control channel, thereby reducing group overhead. In this embodiment, a mobile station may be assigned more than one group position within the same group. For example, the base station may assign a mobile station one group position for broadcast/multicast and another group position for VoIP.

After the group of mobile stations has been determined, the base station 103 sends an indication to the mobile stations 101 of each mobile station's position in the group and an indication of the group identifier. A control channel may be used to send the indications. The base station 103 may use the group identifier to send control information valid for the entire group. For example, the base station 103 may change the frequency allocation for the group by sending an indication of the group identifier and an indication of the new frequency allocation. The position indications may be sent to each mobile station separately or may be sent to several mobile stations at once.

For example, the base station 103 may send a list of wireless mobile station unique identifiers along with a group identifier. Any appropriate rule may be used to determine the position indication, for example, the first mobile station in the list of unique identifiers may be assigned the first position, the second mobile station in the list of unique identifiers may assigned the second position, etc. The mobile station unique identifier may be an Electronic Serial Number (ESN), a subscriber hardware identifier, a Medium Access Control Identifier (MAC-Id), or any other suitable identifier that uniquely identifies a particular mobile station.

Figure 4:
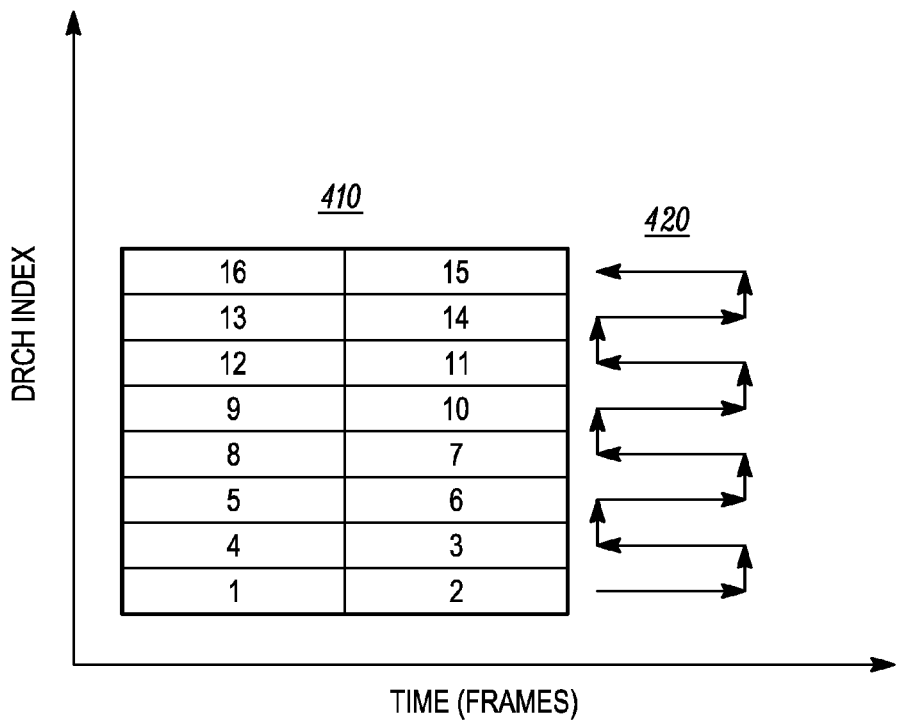
FIG. 4 is logical diagram representation of a set of shared resources.

For each mobile station group, a scheduling function of the base station controller 109, or base station 103, may assign a set of time-frequency resources to be shared by the mobile stations in the group. FIG. 4 shows an exemplary set of shared resources. In FIG. 4, the shared resources 410 are two frames (one long frame) and eight DRCHs. If a block is defined as one frame in the time domain and one DRCH in the frequency domain, then there are 16 blocks or resources, numbered 1 through 16. As previously discussed, a DRCHs is a group of non-contiguous subcarriers, so the DRCH Index which is the vertical axis of FIG. 4, is a logical representation of the frequency domain. As will be discussed later, each mobile station determines its portion of the shared resource, based on the assignments for other mobile stations. Therefore, it is necessary to define the order in which the resources are to be allocated. In FIG. 4, an illustrative ordering pattern 420 is given which results in the blocks being numbered 1 through 16 as shown in FIG. 4. The set of shared resources may be repeatedly used in an interlace pattern as described with respect to FIG. 3. For example, the 16 resources may be repeatedly used in each long frame of interlace pattern 0 in FIG. 3. Again, the 16 resources illustrated by FIG. 4 are logical representations of a set of sub-carriers in the frequency domain in a frame. It is to be understood that the exact physical location of these sub-carriers may change from frame to frame.

An indication of the set of shared resources and the ordering pattern may be signaled from the base station 103 to the mobile stations 101 using a control channel. Further, the control channel may be transmitted in any frame with a pre-defined relationship with the beginning frame of the set of shared resources. The set of shared resources may begin in the same frame the control channel is transmitted, may have a fixed starting point relative to the frame that the control channel is transmitted, or may be explicitly signaled in the control channel.

After the mobile stations are grouped, assigned a position (also called location) within the group, and a set of shared resources is assigned to the group, the base station 103 must indicate which mobile stations are active in a given time period, and, in some embodiments, the number of assigned resources assigned to each mobile station.

Figure 5A:
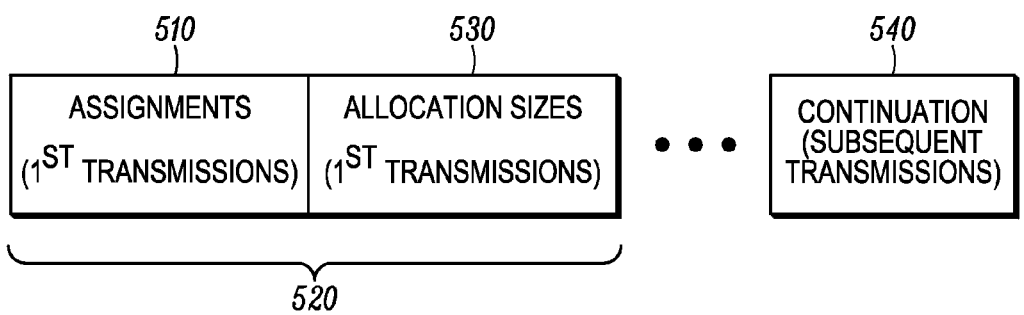
FIGS. 5a and 5b are diagrams of bitmaps sent in a shared control channel for resource assignment purposes.

FIG. 5*a* illustrates how resource assignments may be indicated to mobile stations 101. In FIG. 5, a first message field, mobile station assignments 510, indicates which mobile stations are assigned at least one of the shared resources in the corresponding set of group shared resources. A mobile station resource allocation field 530 may indicate specific resources, and/or the number of resources assigned to each mobile station. In the various embodiments, a continuation field 540 may also be included as will be described further below.

Figure 5B:
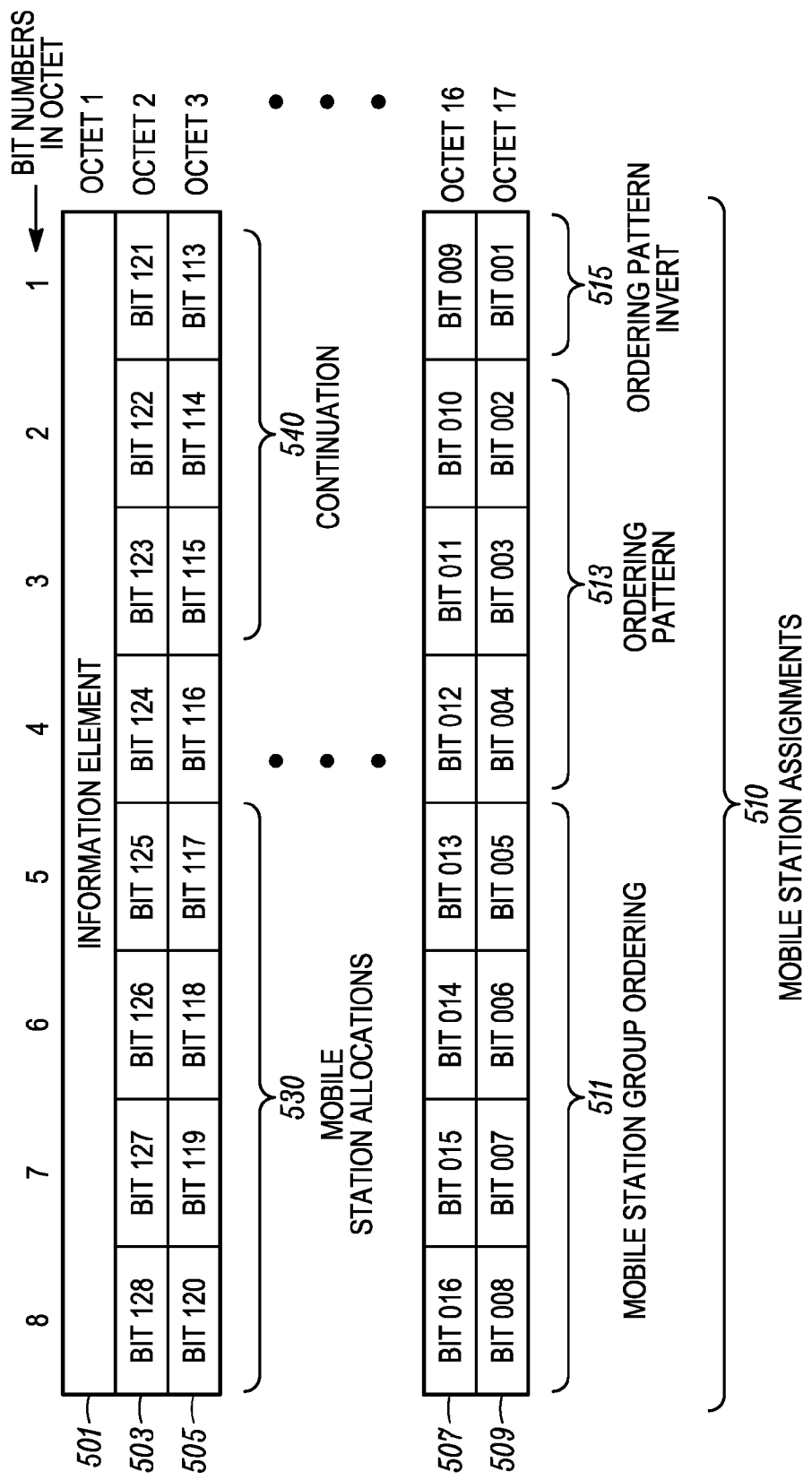

FIG. 5*b* show an example with further details of how the message of FIG. 5*a* may convey information using bit mapping. FIG. 5*b* represents an information element 501 which as discussed above, may be sent to the mobile station over a control channel. In the case of a mobile station group as discussed above, the information element 501 may be sent using a shared control channel. The information element 501 may comprise a number of octets as shown, and may vary in size depending on, for example, the number of mobile stations in a group, sharing the control channel. Therefore, the information element 501 may be any appropriate size for conveying the necessary information to the mobile station group.

Thus, the mobile station assignments 510 may comprise a number of bitmap fields, for example Bits 001 through bit 008 of octet 17, item 509, as shown in FIG. 5*b*. In the example illustrated, the position of any mobile station within its group may corresponds to its bitmap position. For example, the mobile station assigned the first group position, "position 1" may determine if it is assigned one of the shared resources using bitmap position 001. In the example illustrated by FIG. 5*b*, the mobile station positions are indicted by mobile station group ordering field 511. Thus, the first mobile station position in the example of FIG. 5*b* would correspond to Bit 005, which is the first position of the mobile station group ordering field 511. The mobile station assigned group position 2 may determine if it is assigned one of the shared resources using second position of the mobile station group ordering field 511, etc. Further, an active user indication may be provided by using either a binary "0" or a "1", where inactive users are indicated using the opposite state, or some other appropriate binary values may be used.

It is to be understood that a bitmap field may comprise one or more bits, and that a group of bits may be used for any designation or indication. Thus, the mobile station assignments 510 and sizes field 530 may provide two bits per mobile station, wherein binary "00" indicates no transmission, and "01," "10" and "11" indicate transmissions occupying various numbers of blocks. For example, "01" may correspond to a single block, "10" may correspond to two blocks, and "11" may correspond to three blocks. It is also to be understood that a nonlinear mapping may also be used. For example, "01" may correspond to a single block, "10" may correspond to two blocks, and "11" may correspond to four blocks. For simplification of explanation henceforth, the assignments field 510 and the allocations sizes field 530 may be referred to herein together as "assignments and sizes" field 520 with the understanding of the various structures such fields may have as was discussed above.

Returning to FIG. 5*b*, active mobile stations may be indicated using a binary "1" in an appropriate corresponding position of the assignment bitmap 510 which is contained in the information element 501. Some embodiments, may include a single bit located at the logical beginning, or any other appropriate location or field, of the assignment bitmap 510, denoted the "ordering pattern invert field" 515. For example, the binary value of a bit, such as Bit 001, may indicate whether to follow a specifically designated ordering pattern in ascending or descending order. Thus, a binary '0' may indicate that the mobile stations should use a first designated ordering pattern in ascending order (not inverted), while a binary '1' may indicate that the ordering pattern should be inverted, that is, in descending order.

In other embodiments, several ordering patterns may be established, and the base station 103 may indicate the ordering pattern to be used by the mobile station 101 group via ordering pattern field 513 of the assignment bitmap 510. Therefore the base station 103 may indicate the desired ordering pattern during each scheduling instance. Further, the ordering pattern may be established at call setup and not signaled as part of the mobile station assignments 510.

Thus, in FIG. 5*b*, Bit 002, 003 and 004 may form the ordering pattern field 513 for designating the appropriate ordering pattern, and Bit 001 may form an ordering patter invert field 515 for indicating whether the ordering pattern is in ascending or descending order.

In FIGS. 5*a* and 5*b*, the allocation sizes field 530 indicates radio resource assignment weighting information, and may also indicate a proportion of radio resources assigned, to the mobile stations. The radio resource assignment weighting information may also indicate a specified number or size of radio resources assigned to each mobile station.

In some embodiments, the radio resource assignment weighting information may also include vocoder rate, modulation, or coding information. If there is only one possible weighting value, the allocation sizes field 530 may be omitted. The information element 501 which contains the mobile station assignments field 510 and, if used, the allocation sizes field 530 as discussed above, are sent to the mobile station group over the shared control channel. Also as discussed above the mobile station group also shares a set of time-frequency resources. The shared control channel is typically transmitted by the base station 103 in each long frame for assigning resources within the long frame, although it is understood that the shared control channel could be transmitted by the base station 103 in any preceding long frame. In the various embodiments, the information element 501 may also include a continuation field 540 which may comprise any appropriate number of bits and which will be described in further detail below.

In some embodiments wherein hybrid automatic repeat request (HARQ) is utilized, resources are allocated, that is, the size of the allocation (the number of blocks) is only indicated, for the first transmission in a series of HARQ transmission opportunities. In such embodiments, a continuation is indicated, via continuation field 540, for the subsequent transmission opportunities. Further in such embodiments, the continuation indication may be provided by a single bit.

In the various embodiments, the mobile station assignments and sizes field 520 is utilized by each mobile station in the current frame for which a first HARQ transmission opportunity is defined, and the continuation field 540 is utilized by each mobile station in the current frame for which a subsequent, that is, a second, third, or fourth HARQ transmission opportunity is defined. The mobile station assignments and sizes field 520 may indicate the number of blocks allocated for the first transmission. For this case, the continuation field may indicate that the same number of blocks allocated by the mobile station assignments and sizes field 520 are allocated for the subsequent transmissions or may indicate that a different number of blocks, for example a single block, is allocated for the subsequent transmissions.

In some embodiments, the mobile station assignments and sizes field 520 is an index to a resource allocation table, where the resource allocation table indicates the number of blocks allocated for each HARQ transmission opportunity. FIG. 6 provides an example of such a table in accordance with the various embodiments. As illustrated by FIG. 6, the mobile station assignments and sizes field 520 may provide two binary bits per mobile station in which the two binary bits index a resource allocation table 600.

For example, referring to FIG. 6, row 611, if a mobile station assignments and sizes field 520 indicates binary '00' for a particular mobile station, then the mobile station will be allocated one block for the first HARQ transmission opportunity per column 603, one block for the second HARQ transmission opportunity per column 605, one block for the third HARQ transmission opportunity per column 607, and one block for the fourth transmission opportunity per column 609.

If the mobile station assignments and sizes field 520 indicates binary '11' as shown in index column 601, four blocks will be allocated to the mobile station for the first HARQ transmission opportunity as shown in column 603, two blocks for the second HARQ transmission opportunity per column 604, one block for the third HARQ transmission opportunity per column 607, and one block for the fourth transmission opportunity per column 609. The index column 601, may in some embodiments also correspond to a vocoder rate employed for the VoIP communication. For example, "00" may correspond to an ⅛ rate vocoder, "01" to a ¼ rate, "10" to a ½ rate, and "11" to a full rate vocoder, respectively.

Thus, the table 600 may comprise a block allocation for HARQ retransmissions to achieve an expected error criteria. For example, the table 600, given the vocoder rates above was found by simulation of four transmissions for a 1% error where the number of blocks used for each transmission was found by minimizing the average number of time-frequency resources required to achieve the 1% error criteria based on error probabilities after 1 to x blocks, where x was chosen as 16. The block size is indicative of the number of subcarriers used for one timeslot (one slot=5/9 ms). Each time slot having 5 OFDM total symbols, one being for pilot and control, thus 4 symbols for VoIP transmissions. For example, if the block size for a ⅛ rate frame is 11 subcarriers and one block is used, then 11×4=44 time-frequency resources are available.

Thus in the various embodiments wherein a resource allocation table is used, such as table 600, the continuation field 540 is used to index the table row corresponding to the mobile station assignments and sizes field 520 allocation and wherein the table columns correspond to the particular HARQ transmission opportunity.

Figure 7:
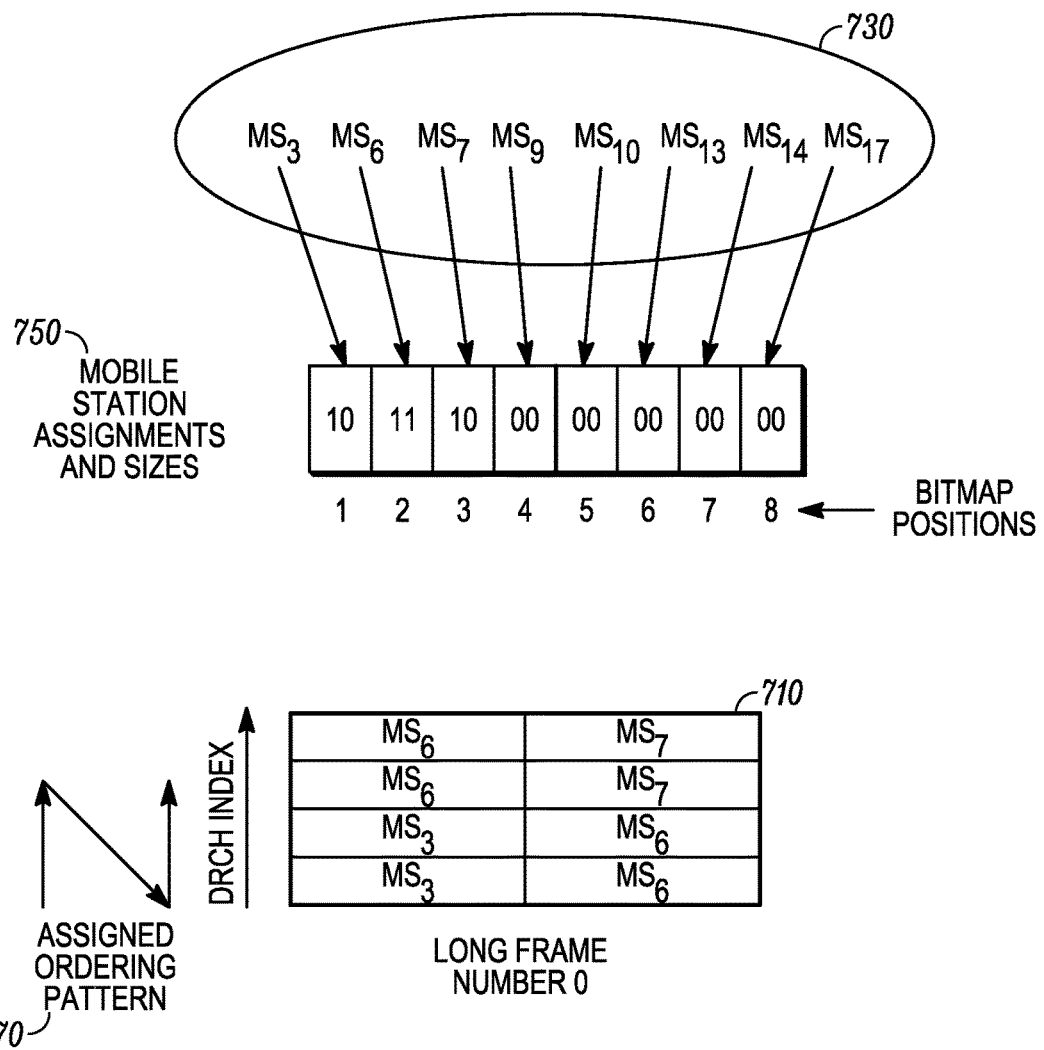
FIG. 7 is a diagram showing an exemplary resource allocation and ordering pattern for a group of mobile stations.

FIG. 7 provides further details of mobile station assignment and resource allocation. In FIG. 7, eight mobile stations are assigned to a group 730 and are assigned group positions 1 through 8, which correspond to bitmap positions 1 through 8 in the mobile station assignments and sizes field 520. Thus, mobile station 3 (MS3) is assigned bitmap position 1, mobile station 6 (MS6) is assigned bitmap position 2, mobile station 7 (MS7) is assigned bitmap position 3, mobile station 9 (MS9) is assigned bitmap position 4, mobile station (MS10) is assigned bitmap position 5, mobile station 13 (MS13) is assigned bitmap position 6, mobile station 14 (MS14) is assigned bitmap position 7, and mobile station 17 (MS17) is assigned bitmap position 8. Each bitmap position provides two binary bits, where '00' indicates no transmission, '01' indicates an assignment of one block, '10' indicates an assignment of two blocks, and '11' indicates an assignment of four blocks. It is to be understood that the bitmap positions may correspond to one or more bitmap positions in one or more bitmap fields such as, assignments field 510 and allocation sizes field 530, as was discussed previously. Also as discussed previously, it is to be understood that assignments field 510 and allocation sizes field 530 is, for the sake of simplicity of explanation herein, referred to collectively as assignment and sizes field 520.

Returning to FIG. 7, a base station may, in addition to assigning position information, provide to group 730 an indication of the set of shared resources 710 and a assigned ordering pattern 770 indicating the order in which the resources are allocated. The position information, ordering pattern, and shared resource information may be sent by the bases station to the mobile station group 730 using a control channel.

Active mobile stations are also indicated via the mobile station assignments and sizes field 750 via a binary "01," "10" or "11" in the appropriate bitmap field positions. The mobile station assignments and sizes field 750 may be transmitted on a shared control channel every long frame. As illustrated in FIG. 7, the mobile station assignments and sizes field 750 assigns the Nth active mobile station in each long frame to the Nth set of blocks, where the assigned number of blocks is either 1, 2, or 4 as was discussed above.

Thus for example, MS3 is assigned the first two resources of resources 710, since it is the first active mobile station, that is, it does not have a "00" (inactive mobile) indicator in the mobile station assignments and sizes field 750. MS3 is assigned two resources, since "10" is indicated in the mobile station assignments and sizes field 750. MS6 which does not have a '00' in the mobile station assignments and sizes field 750, that is, the second active mobile station, is assigned the second set of blocks. MS6 is assigned four blocks, since binary "11" is indicated in the mobile station assignments and sizes field 750.

MS6 must sum the number of resources previously allocated (the two that were allocated for MS3) to determine that it is assigned resources three through six as shown in resources 710. MS7 is the third active mobile station and is assigned the third set of blocks. MS7 is assigned two blocks in accordance with the binary "10" indication in the mobile station assignments and sizes field 750. MS7 must sum the number of resources previously allocated, that is, the two resources that were allocated for MS3 and the four resources that were allocated for MS6, to determine that it is assigned resources seven and eight as shown in resources 710.

For some applications including voice, packets arrive at a relatively constant rate. For a VoIP application for example, vocoder frames may arrive approximately every 20 ms.

Referring again to FIG. 3, for a VoIP application, vocoder frames may arrive approximately every 20 ms beginning at the start of long frame number 0. The base station adds header data to the vocoder frame and encodes the frame to form a voice packet. The base station then modulates and transmits at least a portion of the symbols comprising the voice packet to the mobile station in long frame number 0. This transmission is referred to as the first transmission.

The mobile station receiving the packet will attempt to decode it to obtain the voice information. If the mobile station successfully decodes the voice packet obtained from the first transmission, the mobile station will send an acknowledgement (ACK) message to the base station. Upon receiving an ACK, the base station will not transmit any additional information, that is, will not retransmit, the voice packet to the mobile station in long frames 3, 6, and 9. In fact, the mobile station assignments field, for example assignments field 510, allows these resources to be used by other mobile stations. However, if the mobile station was not able to successfully decode the voice packet, it sends a negative acknowledgement (NACK) message to the base station.

The base station will, upon receiving the NACK message, send additional symbols of the voice packet to the mobile station in long frame number 3. This is referred to as the second transmission. If the mobile station successfully decodes the voice packet after the second transmission, it may send an ACK message to the base station. Upon receiving the ACK message, the base station will refrain from transmitting any additional information to the mobile station in long frames 6 and 9. However, if the mobile station was not able to successfully decode the voice packet, it will send a NACK message to the base station which will, in response, send additional symbols of the voice packet in the third transmission, in long frame number 6.

Similarly the mobile station may send an ACK or NACK message depending upon its successful decoding of the third transmission, and for a NACK message the base station will send additional symbols of the voice packet in the fourth transmission, in long frame number 9. Again the mobile station may send an ACK or NACK message depending upon its success in decoding the packet.

Figure 8:
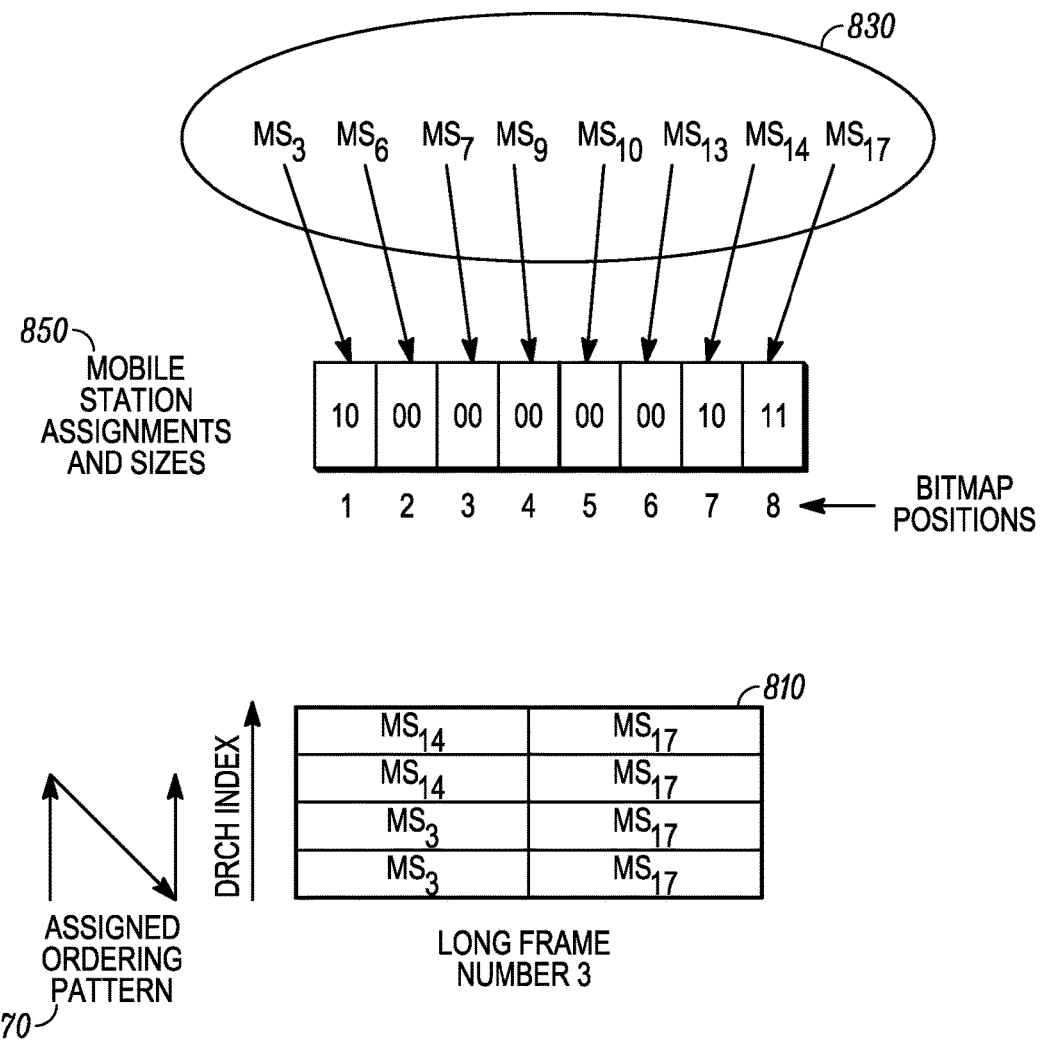
FIG. 8 is a diagram showing the exemplary resource allocation and ordering pattern of FIG. 7 at a subsequent long frame.

FIG. 8 illustrates a moment in time subsequent to the example shown in FIG. 7, that is, a snapshot of long frame number 3 wherein the scenario depicted in FIG. 7 was a snapshot of long frame number 0. Thus in FIG. 7, after long frame 0, MS3 may have sent a NACK message while MS6 and MS7 may have sent ACK messages. Based on the received ACK and NACK messages and the queue status for each mobile station of group 830, in long frame number 3, the base station may allocate two blocks to MS3, two blocks to MS14 and four blocks to MS17 using the mobile station assignments and sizes field 850. Based on the mobile station assignments and sizes field 850, the mobile stations of group 830 are assigned the resources 810 as shown.

In a mixed voice and data system, there may be simultaneously active voice and data mobile stations. Due to the statistical multiplexing properties associated with VoIP traffic, there may be system resources unused by the VoIP users at each scheduling instance. For example, if MS17 was not indicated as active, then the fifth, sixth, seventh, and eighth shared resources would be unused. This loading variation can be calculated by any mobile station monitoring the shared control channel. Thus, in some embodiments, the base station may assign a mobile station to those resources that are not used by the group. To determine its assignment during each VoIP frame, the mobile stations monitors the shared control channel and determines its resources as those that have not been allocated to the group members. For the case where a long frame is comprised of multiple frames, different data users can be assigned the unused resources in each frame. Further, more than one mobile station may be assigned to the unused resources. For example, if there are Z unused resources, a first mobile station may be assigned the first N available unused resources, with a second mobile station being assigned the next Z-N unused resources, where Z>=N.

Alternatively, the mobile stations sharing the unused resources may be instructed to equally divide the unused resources. In another alternative method, the mobile station may be instructed to use an offset value from the first available unused resource, where the offset value is used to point that mobile station to its assignment. This allows an arbitrary assignment for each of the mobile stations sharing the unused resources. When there are less unused resources available than required to support a particular mobile station, then the mobile station is not allocated any resources in that long frame. For example, if the offset value points to a shared resource which is beyond the end of the set of shared resources, then that particular mobile station is not allocated any resources in that long frame.

Figure 9:
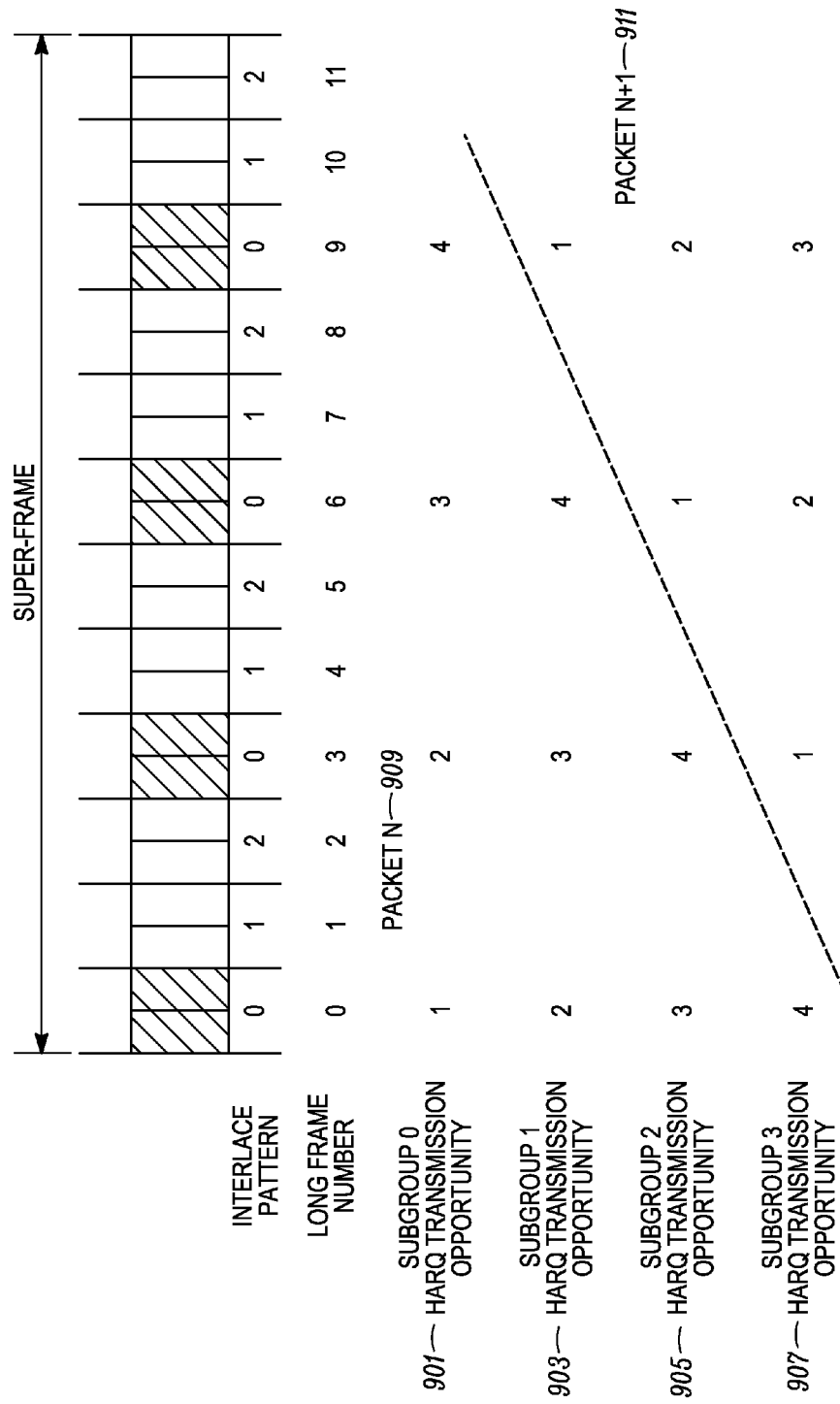
FIG. 9 illustrates the association of a sequence of HARQ transmission opportunities with long frame numbers for different subgroups in accordance with various embodiments.

A mobile station assignments and sizes field utilizing two bits per mobile station per long frame as described, may require an undesirable allocation of system resources for the shared control channel, for example power, OFDM subcarriers or OFDM symbols. Thus, in some embodiments, such shared control channel overhead may be reduced by establishing a predetermined relationship between mobile station group position and mobile station HARQ transmission opportunity. FIG. 9 illustrates an example of this predetermined relationship in accordance with various embodiments.

In the embodiments exemplified by FIG. 9, a primary mobile station group is further subdivided into four subgroups, where each subgroup is assigned a particular sequence for its HARQ transmission opportunities. Thus FIG. 9 illustrates two consecutive encoded packets denoted as packet N 909, and packet N+1 911, where N is a positive integer. The base station may thus define the first, second, third, and fourth HARQ transmission opportunities of packet N for subgroup 0 901 to occur in long frame numbers 0, 3, 6, and 9, respectively as shown. Similarly, the base station may define the second, third, and fourth HARQ transmission opportunities of packet N and the first HARQ transmission opportunity of packet N+1 for subgroup 1 903 to occur in long frame numbers 0, 3, 6, and 9 respectively as shown.

This process is repeated as shown in FIG. 9 for subgroups 2 905 and 3 907. The particular sequences of HARQ transmission opportunities repeat at a known interval, for example in each superframe as shown in FIG. 9, for subsequent packets. Based on the established relationships between the subgroups and the HARQ transmission opportunities, the base station may allocate mobile stations to the subgroups in any systematic way as long as it is known by all mobile stations in the group.

For example, for a mobile station group of size "K," the base station may define the first K/4 group positions to belong to subgroup 0, the second K/4 group positions to belong to subgroup 1, the third K/4 group positions to belong to subgroup 2, and the last K/4 group positions to belong to subgroup 3.

Important to understand is that the predetermined relationship between group position and HARQ transmission opportunity, enables each mobile station in the group to a priori know the HARQ transmission opportunity for all other members of the group. The predetermined relationship may be transmitted from the base station to the mobile stations on a control channel or may be stored at the mobile station, for example in memory.

In some embodiments, resources are allocated to the subgroups in an order corresponding to the defined HARQ transmission opportunity. For example, mobile stations indicated as active in the shared control channel and having their first HARQ transmission opportunity in the current long frame may be allocated first in the set of shared resources. Mobile station indicated as active in the shared control channel and having their second HARQ transmission opportunity in the current long frame may be allocated second in the set of shared resources, etc.

If the subgroups correspond to a contiguous set of group positions, as described above where the first K/4 group positions correspond to subgroup 0, the second K/4 group positions correspond to subgroup 1, etc, then this may be thought of as rotating the bitmap in a circular fashion, such that the first bitmap position corresponds to the first mobile station in the group for which a first HARQ transmission opportunity is defined. An indication of the bitmap rotation may be transmitted from the base station to the mobile station on a control channel or may be stored at the mobile station.

Figure 10:
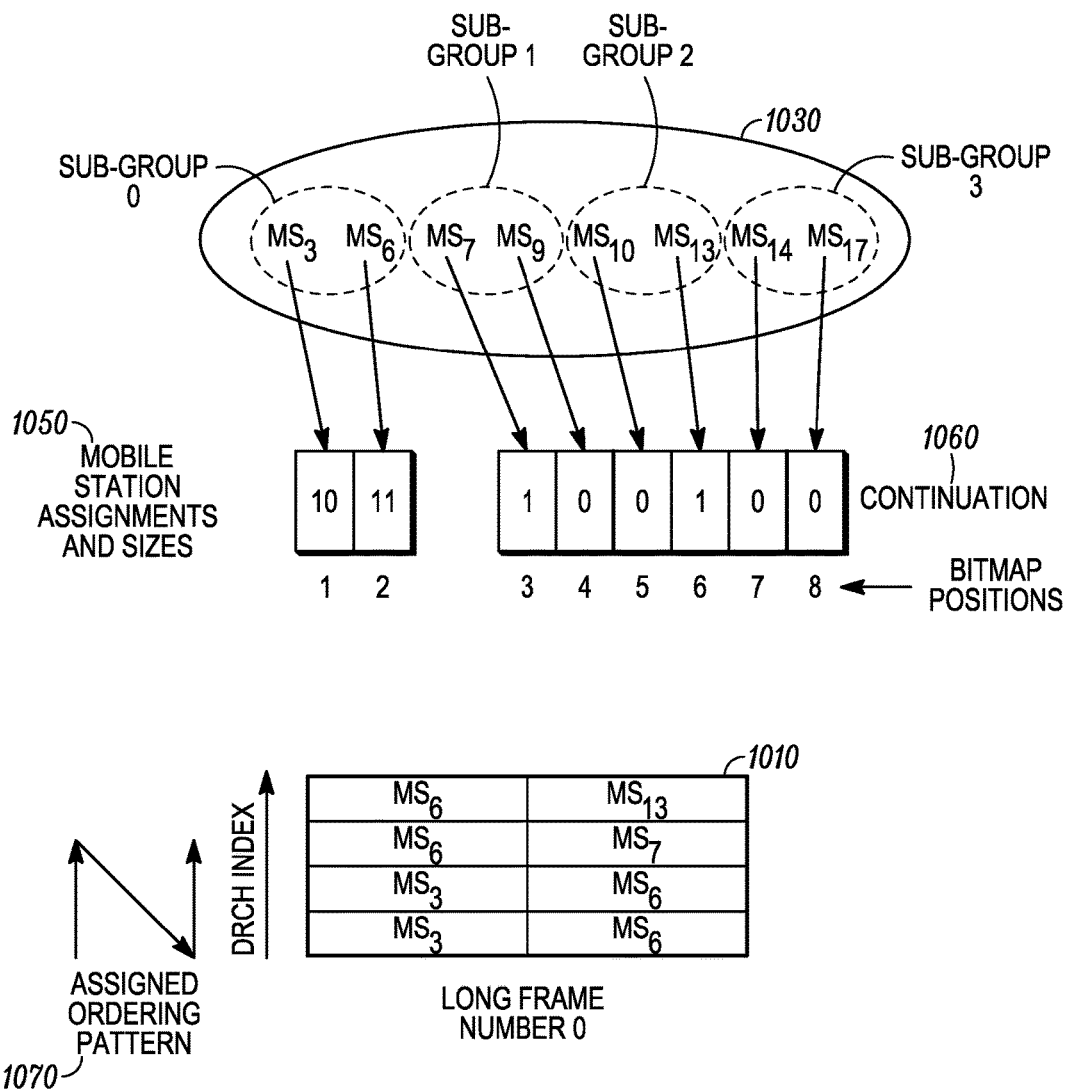
FIG. 10 is a diagram of another exemplary resource allocation and ordering pattern in accordance with various embodiments.
Figure 11:
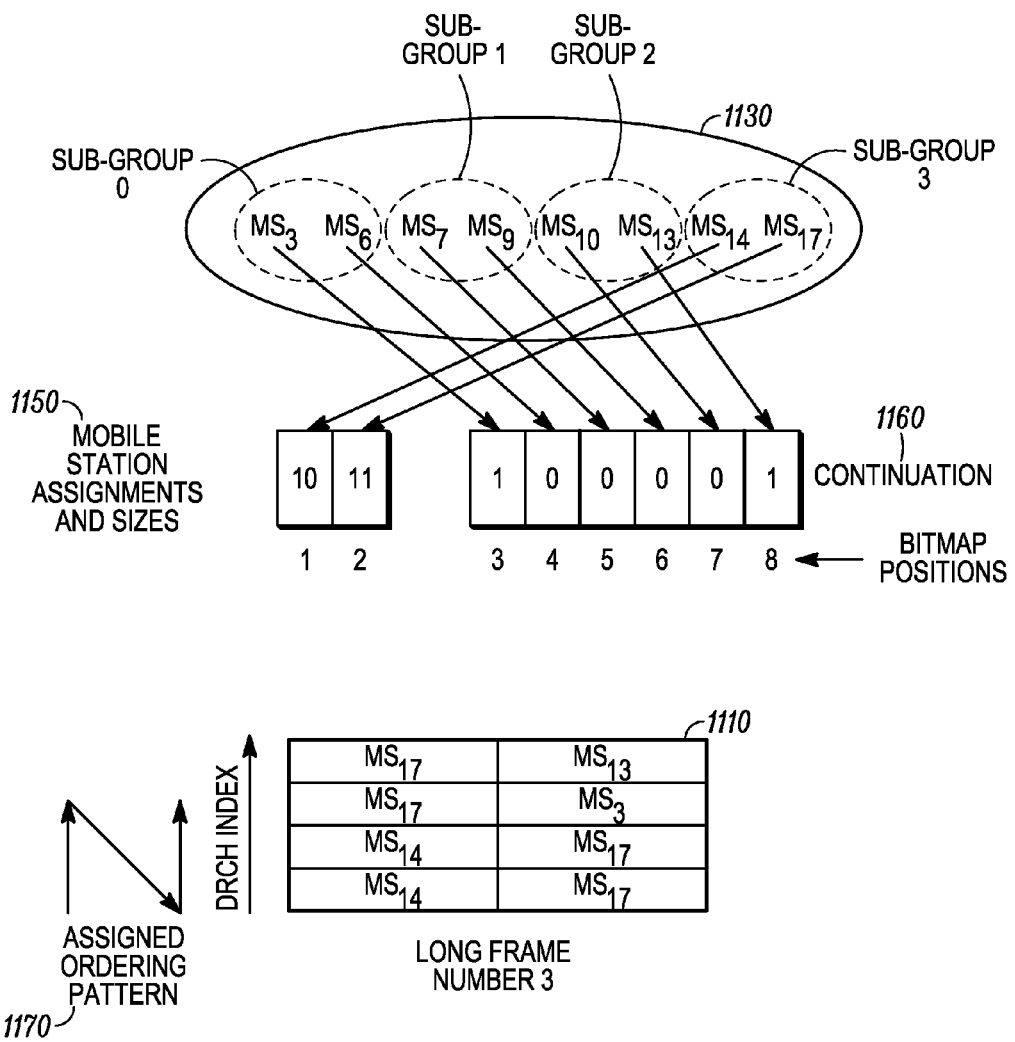
FIG. 11 is a diagram showing the exemplary resource allocation and ordering pattern of FIG. 10 at a subsequent long frame in accordance with various embodiments.

FIG. 10 and FIG. 11 illustrate exemplary allocation policies of the various embodiments having the continuation bitmap field 540. FIG. 11 assumes a moment in time subsequent to the example shown in FIG. 10, that is, a snapshot of long frame number 3 wherein the scenario depicted in FIG. 10 is a snapshot of long frame number 0.

Thus, in the example of FIG. 10, the mobile station assignments and sizes field 1050 indicates the number of blocks allocated to each mobile station of group 1030, where binary "00" corresponds to no transmission, "01" corresponds to one block, "10" corresponds to two blocks and "11" corresponds to four blocks. The continuation field 1060 provides a single bit indicating that one block is allocated to a mobile station. A rotating bitmap, as described above, is used to ensure that the mobile stations with their first HARQ transmission opportunity are allocated resources first, the mobile stations with their second HARQ transmission opportunity are allocated resources second, etc.

Referring to FIG. 10, eight mobile stations are assigned to a group 1030 and are assigned group positions 1 through 8. Mobile station 3 (MS3) is assigned group position 1, MS6 is assigned group position 2, MS7 is assigned group position 3, MS9 is assigned group position 4, MS10 is assigned group position 5, MS13 is assigned group position 6, MS14 is assigned group position 7 and MS17 is assigned group position 8.

Group positions 1 and 2 are assigned to subgroup 0, group positions 3 and 4 are assigned to subgroup 1, group positions 5 and 6 are assigned to subgroup 2, and group positions 7 and 8 are assigned to subgroup 3. The relationship between the subgroups and the HARQ transmission opportunities are similar to those shown in FIG. 9. In addition to assigning position information, the base station transmits to group 1030 an indication of the set of shared resources 1010 and an assigned ordering pattern 1070 indicating the order in which the resources 1010 are allocated. This information may be transmitted from the base station to the mobile stations on a control channel.

For long frame number 0, the base station allocates resources 1010 to subgroup 0 for their first HARQ transmission opportunity, to subgroup 1 for their second HARQ transmission opportunity, to subgroup 2 for their third HARQ transmission opportunity, and to subgroup 3 for their fourth HARQ transmission opportunity. The base station sends the assignments and sizes field 1050 to indicate the size of the first transmission for the mobile stations assigned to subgroup 0. For example, the base station indicates "10" (2 blocks) for MS3 and "11" (four blocks) for MS6.

For mobile stations requiring HARQ retransmissions, for example if MS7 requires a second transmission and MS13 requires a third transmission, the base station will indicate continued transmissions (1 block) for MS7 and MS13 using the continuation field 1060 as shown.

The base station will encode and send the mobile station assignments and sizes 1050 and continuation fields 1060 over the shared control channel. The mobile stations receive and decode the shared control channel to determine the mobile station assignments and sizes 1050 and continuation fields 1060. For example, based on these fields and the long frame number, MS3 may determine that it is the first mobile station allocated resources and that it is allocated two blocks due to the binary "10." Therefore, MS3 determines its resource allocation as shown in 1010. Likewise MS6 may determine that it is the second mobile station allocated resources and that it is allocated four blocks. MS6 determines that two blocks were previously allocated and therefore determines its allocation as shown in resources 1010. MS7 thus determines that is the third mobile station allocated resources and that is allocated one block from continuation field 1060. Because six blocks were previously allocated, MS7 determines its allocation as shown in resources 1010. MS13 determines that is the fourth mobile station allocated resources, because MS9 and MS10 are not active per the continuation field 1060, and thus determines that is allocated one block. MS13 determines that seven resource blocks were previously allocated and therefore determines its allocation as shown in resources 1010.

FIG. 11 shows example allocations for long frame number three. Referring again to FIG. 9, the base station allocates resources to subgroup 4 for their first HARQ transmission opportunity, subgroup 0 for their second HARQ transmission opportunity, subgroup 1 for their third HARQ transmission opportunity, and subgroup 2 for their fourth HARQ transmission opportunity. As depicted in FIG. 11, the bitmap rotates such that the mobile stations in subgroup 3 907 appear first in the bitmap and are therefore allocated resources first.

For example, MS6 may have sent an ACK message to the base station, while MS3 and MS13 may have sent NACK messages. Further, the base station may have new packets to transmit, for example, to MS14 and MS17. The base station will thus send the mobile station assignments and sizes field 1150 indicating the size of the first transmission for subgroup 3, that is, for MS14 and MS17. The base station therefore sends "10" (2 blocks) for MS14 and "11" (four blocks) for MS17 using the mobile station assignments and sizes field 1150. The base station also indicates continued transmissions (1 block) for MS3 and MS13 using the continuation field 1160.

The base station encodes and send the mobile station assignments and sizes 1150 and continuation fields 1160 on the shared control channel. Resource assignments as depicted in FIGS. 10 and 11, include the assignment of unused resources within the group whereby a subscriber locates the potential resource by reading the bitmap and calculating the location of the first unused resource. Also, more than one user may be assigned to the unused resources as previously described. The mobile stations receive and decode the shared control channel to determine the mobile station assignments and sizes 1150 and continuation fields 1160. Based on these fields and the long frame number, the mobile stations determine their allocations as shown in resources 1110.

Figure 12:
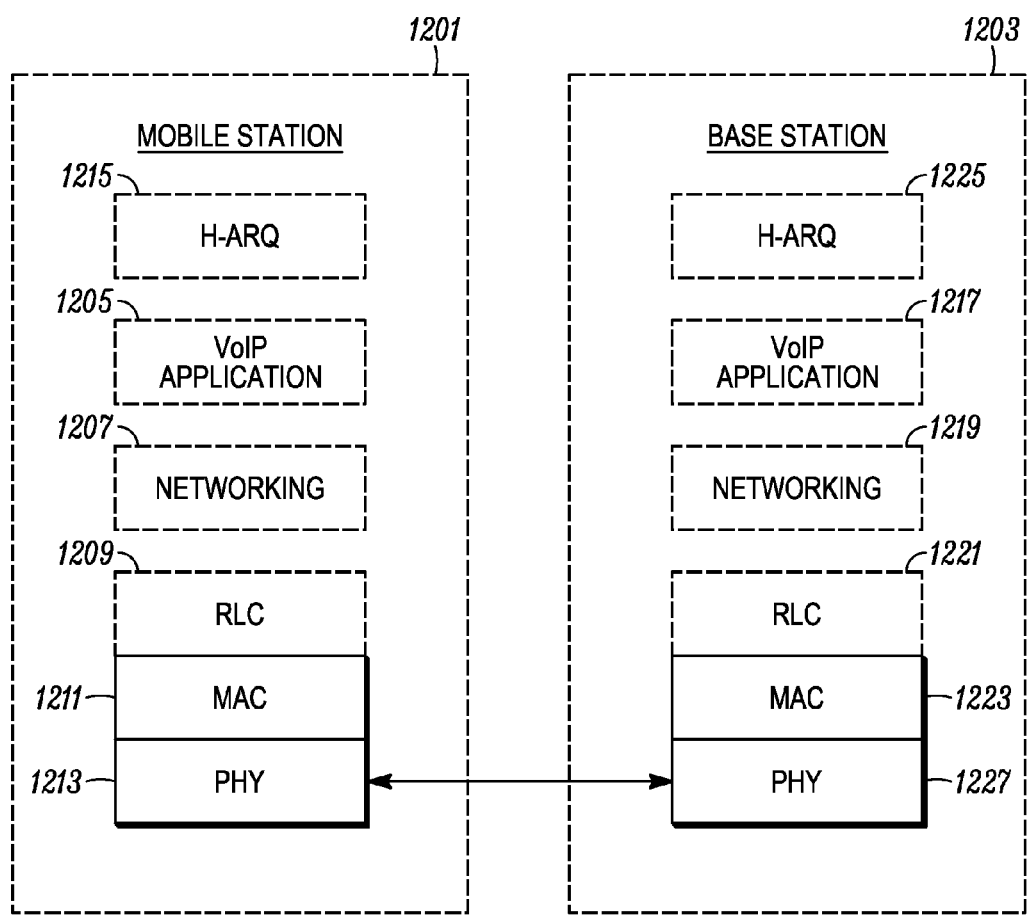
FIG. 12 is a block diagram of a mobile station and base station architecture in accordance with various embodiments.

Turning now to FIG. 12, a mobile station 1201 and base station 1203 architectures in accordance with the various embodiments are illustrated. Mobile station 1201 comprises a stack having a VoIP application 1205, a networking layer 1207, a Radio Link Controller (RLC) 1209, a Medium Access Controller (MAC) 1211, and a Physical Layer (PHY) 1213. In addition, mobile station 1201 has HARQ component 1215, which may be separate or may be integrated into any of the other components/layers. As described in detail above, the mobile station 1201 HARQ component 1215 may receive a continuation field and/or a resource allocation table for determining its resource allocations for receiving subsequent HARQ block retransmissions.

The base station 1203 similarly has a VoIP application 1217, a networking layer 1219, a RLC 1221, MAC 1223 and PHY 1227. However, base station 1203 additionally has in the various embodiments HARQ scheduling component 1225. As described in detail above, the base station 1203 HARQ scheduling component 1225 may send a continuation field and/or a resource allocation table to groups and/or subgroups of mobile stations for indicating their resource allocations for receiving subsequent HARQ block retransmissions. Further, the HARQ scheduling component 1225 may define the HARQ subgroups in some embodiments.

Figure 13:
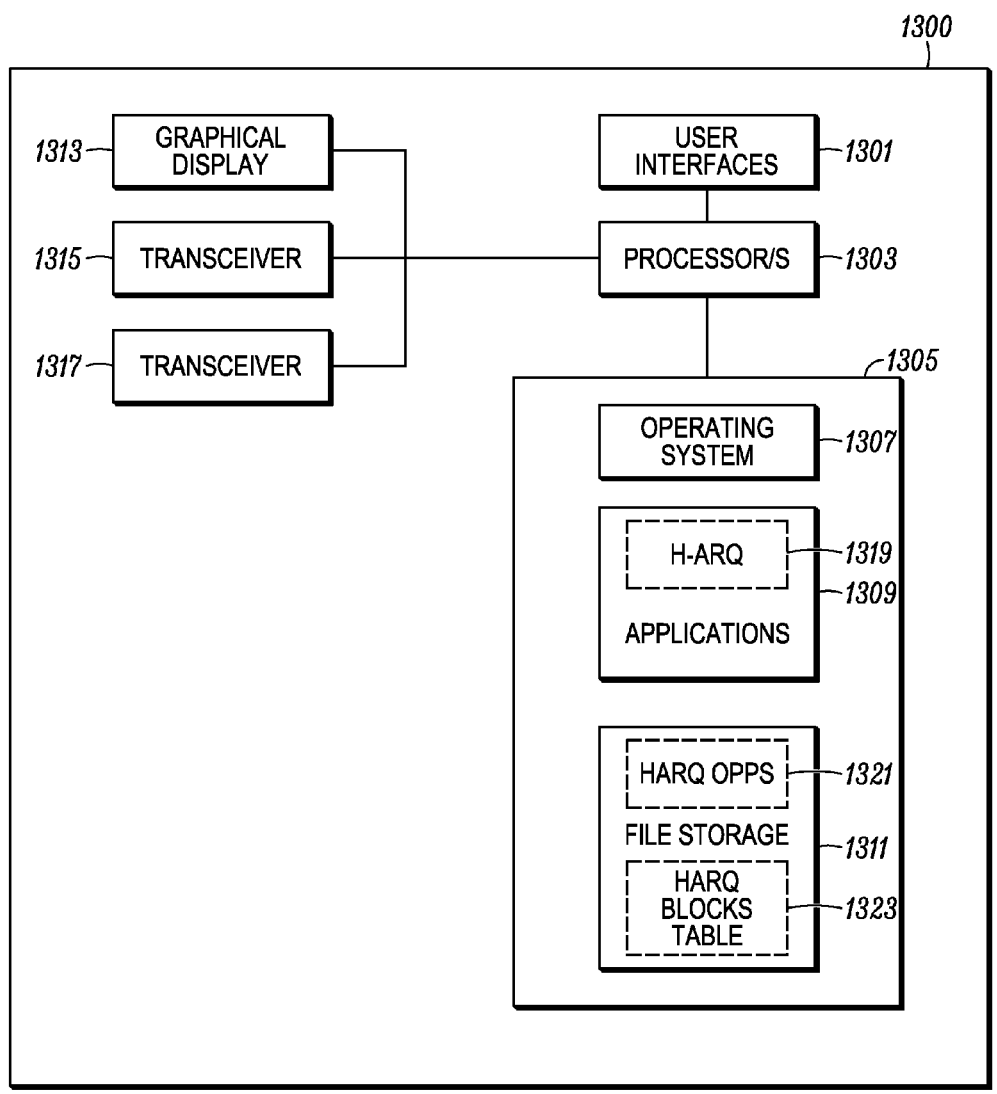
FIG. 13 is a block diagram of a mobile station in accordance with various embodiments.

FIG. 13 is a block diagram illustrating the primary components of a mobile station in accordance with some embodiments. Mobile station 1300 comprises user interfaces 1301, at least one processor 1303, and at least one memory 1305. Memory 1305 has storage sufficient for the mobile station operating system 1307, applications 1309 and general file storage 1309. Mobile station 1300 user interfaces 1301, may be a combination of user interfaces including but not limited to a keypad, touch screen, voice activated command input, and gyroscopic cursor controls. Mobile station 1300 has a graphical display 1313, which may also have a dedicated processor and/or memory, drivers etc. which are not shown in FIG. 13.

It is to be understood that FIG. 13 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 13 and still be within the scope of the present disclosure.

Returning to FIG. 13, the mobile station 1300 may also comprise a number of transceivers such as transceivers 1315 and 1317. Transceivers 1315 and 1317 may be for communicating with various wireless networks using various standards such as, but not limited to, UMTS, E-UMTS, E-HRPD, CDMA2000, 802.11, 802.16, etc.

Memory 1305 is for illustrative purposes only and may be configured in a variety of ways and still remain within the scope of the present disclosure. For example, memory 1305 may be comprised of several elements each coupled to the processor 1303. Further, separate processors and memory elements may be dedicated to specific tasks such as rendering graphical images upon a graphical display. In any case, the memory 1305 will have at least the functions of providing storage for an operating system 1307, applications 1309 and general file storage 1311 for mobile station 1300. In some embodiments, and as shown in FIG. 12, applications 1309 may comprise a software stack that communicates with a stack in the base station. Therefore, applications 1309 may comprise HARQ component 1319 for providing the capabilities of using the HARQ scheduling information received from a base station as was described in detail above. File storage 1311 may provide storage for an HARQ OPPS allocation, as illustrated by FIG. 9, and an HARQ Blocks table, such as table 600 illustrated by FIG. 6.

Figure 14:
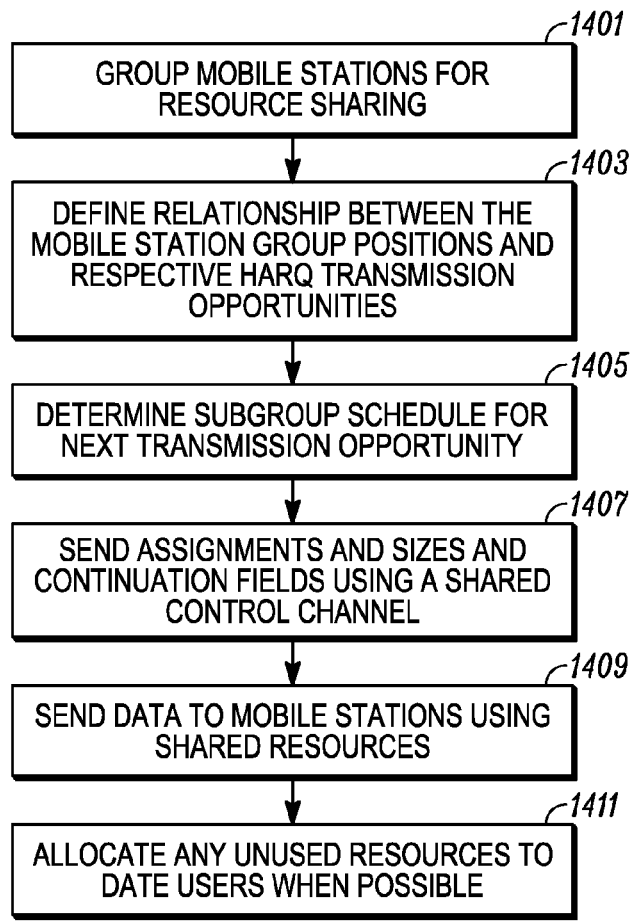
FIG. 14 is a flow chart showing operation of the base station in accordance with an embodiment.

FIG. 14 summarizes operation of a base station in accordance with the various embodiments. In 1401, the base station groups mobile stations for scheduling resources based on various criteria as was discussed previously. In 1403, the base station defines the relationship between the mobile station's group positions and their respective HARQ transmission opportunities as was described with respect to FIG. 9. In 1405, the base station may further determine subgroups for the next transmission opportunity. In 1407, the base station sends a mobile station assignments and sizes and continuation message, which may be a bitmapping sent over a shared control channel as previously described. In 1409, the base station may send data to the mobile stations using the set of shared resources. In 1411 the base station may also allocate any unused resources to data users when VoIP mobile stations are not active.

Figure 15:
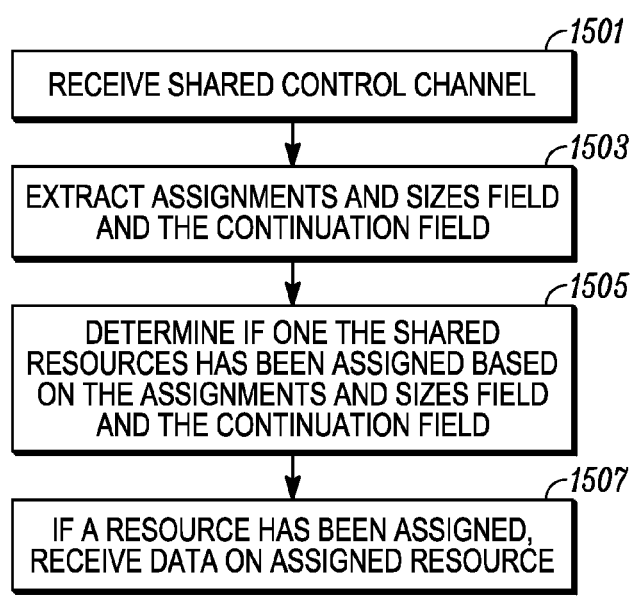
FIG. 15 is a flow chart showing operation of a mobile station in accordance with an embodiment.

FIG. 15 is a flow chart showing operation of a mobile station 102 receiving the shared control channel. In 1501 the mobile station receives a shared control channel and extracts an assignment and sizes field or fields, and a continuation field in 1503. In 1505, determines if one the shared resources has been assigned based on the assignments and sizes field and the continuation field. Finally, in 1507, if a resource has been assigned, the mobile station receives data on the assigned resource.

Figure 16:
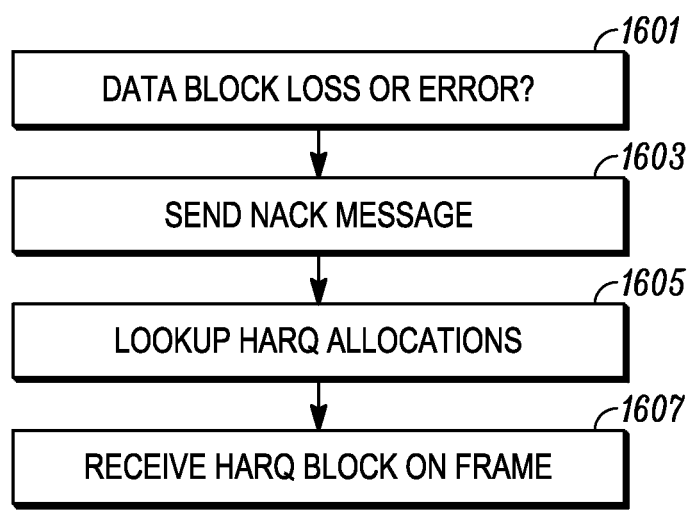
FIG. 16 is a flow chart showing operation of a mobile station in accordance with various embodiments.

FIG. 16 illustrates further mobile station operation in accordance with some embodiments. In 1601 the mobile station determines that a data block is lost, not received, or otherwise that a decoding error has occurred, for example based upon a CRC bit or bits. The mobile station sends a NACK message in 1603, thereby invoking HARQ procedures. The mobile station may have a stored table indicating a number of blocks per HARQ transmissions opportunity which may be based upon a vocoder rate employed by the mobile station such as was illustrated by table 600 in FIG. 6. Thus, the mobile station may lookup this information in 1605. Also in 1605 the mobile station may lookup, or otherwise determine from a control channel message such as the bitmap, its subgroup and corresponding HARQ transmission frame (within the superframe) as was described with respect to FIG. 9. In 1607, the mobile station may receive the HARQ block retransmission. Otherwise, if still not received, the mobile station may repeat the procedure for the next given HARQ transmission opportunity.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

The invention claimed is:

1. A method of operating a network infrastructure entity, the method comprising:
   assigning a set of mobile stations to a group, said group controlled with a shared control channel, wherein each mobile station is assigned a group position;
   assigning an ordering pattern for a set of shared resources on the shared control channel, wherein the ordering pattern is indicated by a base station in an ordering pattern field of an assignment bitmap for each scheduling instance, the ordering pattern field designating the ordering pattern and not including the ordering pattern;

assigning said group the set of shared resources based on the assigned ordering pattern, wherein each mobile station of said set of mobile stations uses its assigned group position and the ordering pattern to ascertain its resources from said set of shared resources; and associating each said group position with an automatic repeat request system retransmission opportunity;

sending control information over said shared control channel including mobile station resource assignments for mobile stations of said group requiring a first automatic repeat request system retransmission opportunity, and further including an indicator for mobile stations of said group requiring a subsequent automatic repeat request system retransmission opportunity.

2. The method of claim 1, further comprising:
assigning a number of resources for said subsequent automatic repeat request system retransmission opportunity.

3. The method of claim 1, wherein sending control information over said shared control channel including mobile station resource assignments for mobile stations of said group requiring a first automatic repeat request system retransmission opportunity, further comprises:
sending an index to a resource allocation table, said resource allocation table indicating the number of resources allocated for a first and subsequent automatic repeat request system retransmission opportunities.

4. The method of claim 1, further comprising:
subdividing said group into a set of subgroups, each subgroup having a corresponding long frame position corresponding to an automatic repeat request system retransmission opportunity; and
assigning each of said subgroups to a long frame position.

5. The method of claim 1, wherein including an indicator, further comprises:
sending a single bit indicator in a continuation field of an assignment bitmap over said shared control channel.

6. The method of claim 1, further comprising:
allocating resources to each mobile station of said group in an order corresponding to each said group position and corresponding to said first automatic repeat request system retransmission opportunity.

7. A mobile station comprising:
at least one transceiver;
at least one processor coupled to said transceiver; said processor configured to:
identify, based on information received over a shared control channel, an assigned position of the mobile station within a group and an ordering pattern for allocation of resources, wherein the ordering pattern is indicated by a base station in an ordering pattern field of an assignment bitmap for each scheduling instance, the ordering pattern field designating the ordering pattern and not including the ordering pattern;
determine a first resource allocation for a first automatic repeat request system retransmission opportunity from a shared control message based on the assigned position of the mobile station in the group and the assigned ordering pattern; and
determining a subsequent resource allocation for a subsequent automatic repeat request system retransmission opportunity based on a single bit field of a subsequent shared control message.

8. The mobile station of claim 7, wherein said processor is further configured to determine said mobile station resource location within a set of shared resources, via a shared control message received from a base station and further based on knowledge that base station allocated resources in an order corresponding to said first and said subsequent automatic repeat request transmissions opportunities.

9. The mobile station of claim 7, wherein said processor is further configured to determine a number of resource blocks for said first and said subsequent automatic repeat request system retransmission opportunities from an index received in said shared control message, said index corresponding to an allocation table position having resource block allocations for said first and said subsequent automatic repeat request system retransmission opportunities.

10. The mobile station of claim 9, wherein said index further corresponds to a vocoder rate of said mobile station.

11. A base station comprising:
a transceiver;
a processor coupled to said transceiver, said processor configured to:
assign a set of mobile stations to a group, and control said group with a shared control channel, wherein each mobile station is assigned a group position;
assign an ordering pattern for a set of shared resources on the shared control channel, wherein the ordering pattern is indicated by a base station in an ordering pattern field of an assignment bitmap for each scheduling instance, the ordering pattern field designating the ordering pattern and not including the ordering pattern;
assign said group the set of shared resources based on the assigned ordering pattern, wherein each mobile station of said set of mobile stations uses its assigned group position and the ordering pattern to ascertain its resources from said set of shared resources;
associate each said group position with an automatic repeat request system retransmission opportunity; and
send control information over said shared control channel including mobile station resource assignments for mobile stations of said group requiring a first automatic repeat request system retransmission opportunity, and further including an indicator for mobile stations of said group requiring a subsequent automatic repeat request system retransmission opportunity.

12. The base station of claim 11, wherein said processor is further configured to:
assign a number of resources for said subsequent automatic repeat request system retransmission opportunity.

13. The base station of claim 11, wherein said processor is further configured to:
send control information over said shared control channel including mobile station resource assignments for mobile stations of said group requiring a first automatic repeat request system retransmission opportunity, by sending an index to a resource allocation table, said resource allocation table indicating the number of resources allocated for a first and subsequent automatic repeat request system retransmission opportunities.

14. The base station of claim 11, wherein said processor is further configured to: subdivide said group into a set of subgroups, each subgroup having a corresponding long frame position corresponding to an automatic repeat request system retransmission opportunity; and assign each of said subgroups to a long frame position.

15. The base station of claim 11, wherein said processor is further configured to allocate resources to each mobile station of said group in an order corresponding to each said group position and corresponding to said first automatic repeat request system retransmission opportunity.

* * * * *